United States Patent [19]

Askren et al.

[11] 3,708,226
[45] Jan. 2, 1973

[54] MOTION PICTURE PROJECTOR APPARATUS

[75] Inventors: Lee T. Askren, Rochester, N.Y.; Charles S. Fitzgerald, Westford, Mass.

[73] Assignee: Eastman Kodak Company, Rochester, N.Y.

[22] Filed: July 6, 1971

[21] Appl. No.: 159,901

[52] U.S. Cl. .....................352/109, 352/92, 352/105
[51] Int. Cl. ..............................................G03b 41/10
[58] Field of Search.................352/105, 106, 109, 92

[56] References Cited

UNITED STATES PATENTS

| | | | |
|---|---|---|---|
| 3,539,250 | 11/1970 | Johnston | 352/109 |
| 3,520,596 | 7/1970 | O'Donnell et al. | 352/92 |
| 3,544,207 | 12/1970 | John | 352/109 |
| 3,184,177 | 5/1965 | Hannah | 352/92 |
| 2,948,203 | 8/1960 | Hadley et al. | 352/92 |
| 3,576,368 | 4/1971 | Goetz | 352/105 |
| 2,590,281 | 3/1952 | Sziklai et al. | 352/109 X |

Primary Examiner—Samuel S. Matthews
Assistant Examiner—Alan A. Mathews
Attorney—W. H. J. Kline et al.

[57] ABSTRACT

Motion picture projection apparatus, for use with filmstrips having aligned images areas and spaced discontinuities such as sprocket perforations or frame lines having fixed spacial relationships to the locations of the image areas on the film, includes a drive mechanism for continuously moving film through an illuminated film gate aperture. The resulting projected images are reflected by a rotatable mirror. An electromagnet clutch is actuable by a free-running multivibrator to interconnect the mirror and the film drive mechanism for rotating the mirror in timed relation to the film movement, thereby maintaining the projected image stationary. A shutter is responsive to the multivibrator output to permit illumination of the film in the gate during mirror movement in one direction and to prevent such illumination of the gate during the return stroke of the mirror. While the free-running time of the multivibrator is a few milliseconds longer than the film frame rate, it is synchronized with the frame rate by a trigger circuit controlled by a film discontinuity sensing device.

7 Claims, 4 Drawing Figures

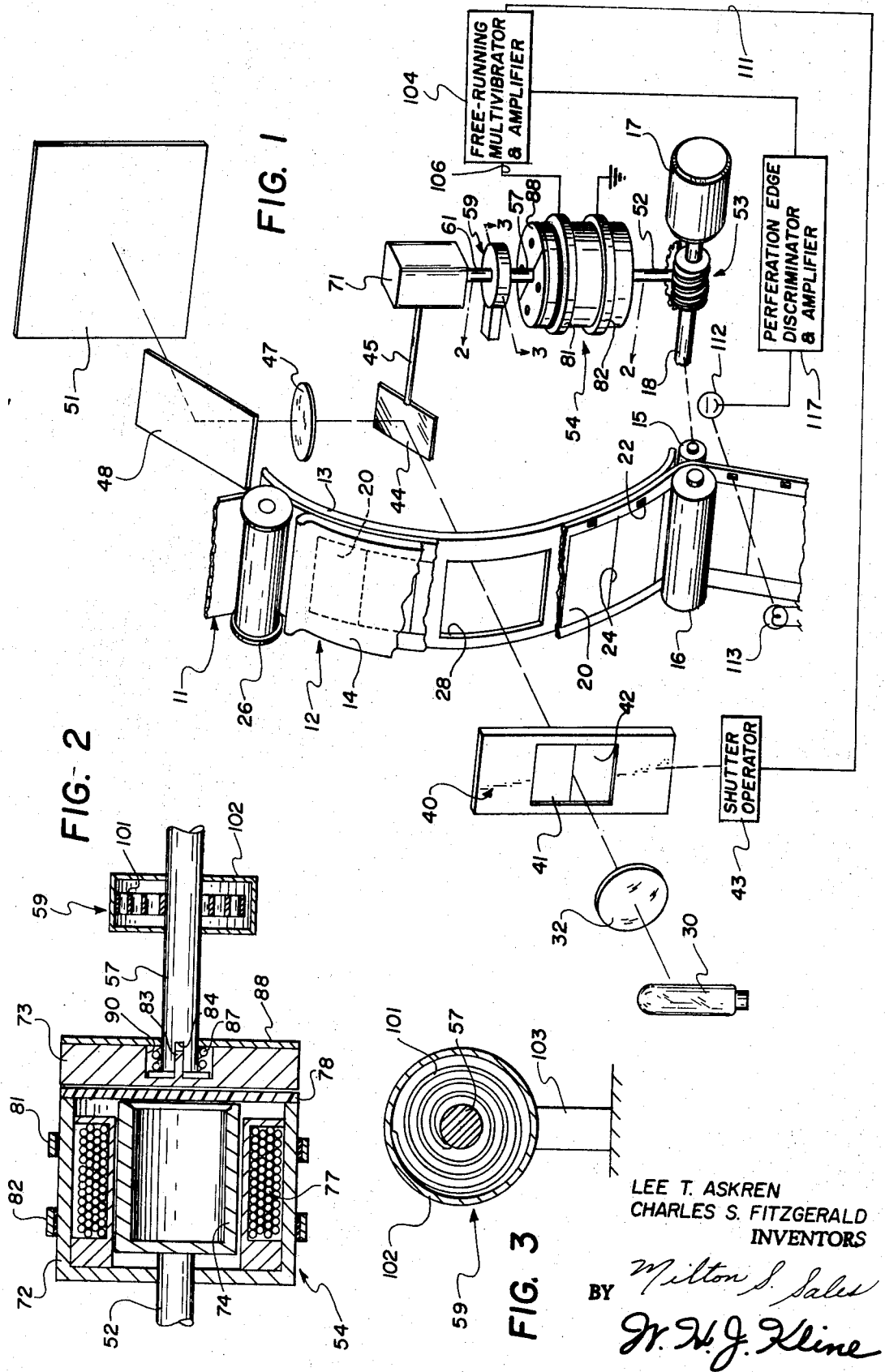

MOTION PICTURE PROJECTOR APPARATUS

BACKGROUND OF THE INVENTION

1. Field of the Invention

This invention relates to motion picture projection apparatus, and more particularly to such apparatus in which a filmstrip is moved continuously past an illuminated frame aperture.

2. Description of the Prior Art

Motion picture film projectors are predominantly of the intermittent motion type. In such projectors, the film is advanced, generally by a pull-down claw mechanism, so that as each image area or picture frame of the film is positioned in a film gate aperture, the film stops for a small, but definite, interval. During that interval, a shutter is opened at least once to illuminate the image area in the aperture and project the image thereat. The shutter is then closed and the film is again advanced to bring the next image area into alignment with the aperture before the film movement is halted and the shutter is again opened.

While intermittent motion projectors are well suited for many applications, there are some situations in which other types of projectors are better suited. For example when the motion picture film is being utilized as a program source for television broadcasting, it has been found advantageous to use projectors of the type in which the film is fed continuously rather than intermittently through the film gate. Also, in industrial and educational fields, it has been found that projectors are frequently operated by inexperienced persons, and that the ease of threading, low noise level and general simplicity of operation which are characteristic of continuous feed projectors makes them especially suitable for these situations. Further, the edges of sprocket perforations soon become damaged when the film is shown in intermittent feed projectors with the regularity common to library film.

In such continuous feed projectors, it is necessary to provide some means to keep the projected image stationary even though the film is in motion. It has been found that the light beam from the projection gate can be intercepted by a pivotally mounted mirror so that when the mirror is caused to rotate with an angular velocity of one half of, and in the same direction as that of a point on the film passing through the aperture, the projected image of that point is stationary. After the sweep is completed, the mirror is quickly returned to its starting position for the next sweep cycle. During this return stroke, a closed shutter intercepts the light beam.

In some prior art projectors incorporating pivotable mirrors, a direct mechanical connection between a capstan roller in contact with the film and the mirror drive mechanism maintains the angular velocity of the mirror in synchronization with the rate of movement of film through the gate. While such control devices are suitable for film having standard size image areas, an attempt to project shrunk film with such apparatus would result in a drifting frame line in the projected image, the severity of which would depend upon the amount of film shrinkage.

The effects of film shrinkage on the projected image can be eliminated by driving the mirror in timed relation to movement of repeated discontinuities in the film if the discontinuities have constant spacial relationships to corresponding image frames. For example, the mirror movement may be keyed to movement of the film frame lines or to sprocket perforations in the film. One example of such apparatus is shown in commonly assigned, U.S. Pat. No. 2,843,006 in the name of Arthur W. Tyler. In the projector disclosed in that patent, the angular position of a rotating mirror is controlled by a mechanism which tracks, by means of a closed loop negative feedback circuit, the movement of film sprocket perforations past a sensing station. Since the perforations have a fixed spacial relationship with the location of the image frames on the film regardless of film shrinkage, the mirror movement will always track the film frames on an individual basis, and film shrinkage will not cause frame line drifting. While the apparatus described in the Tyler patent is quite suitable for professional uses such as in television broadcast stations where projector costs are relatively high, the complexity and expense of such apparatus are prohibitive for amateur and educational markets in which projector costs must be kept to a minimum. Also, since the mirror drive mechanism is controlled by the film perforations, damaged film which either has torn perforations or lacks one or more perforations may cause a malfunction of the mechanism.

SUMMARY OF THE INVENTION

It is an object of the present invention to provide a non-complex motion picture projection apparatus of the type wherein film is moved continuously past an illuminated frame aperture and the resulting projected image is reflected by a movable mirror with improved means for keeping the mirror movement in proper synchronization with the movement of the film image areas regardless of film shrinkage.

It is another object of the present invention to provide a motion picture projection apparatus of the type wherein film is moved continuously past an illuminated frame aperture and the resulting projected image is reflected by a mirror movable in timed relation to movement of repeated discontinuities in the film with means for continuing such mirror movement in the absence of the film discontinuities.

In accordance with a preferred embodiment, a motion picture projection apparatus of the type wherein film is moved continuously past an illuminated aperture in a film gate is provided with a pivotally mounted mirror for intercepting and reflecting the resulting projected image. The mirror is mechanically couplable to the film to be driven thereby at an angular velocity for maintaining the reflected image stationary. The coupling is accomplished by means of an electromagnetic clutch actuated by a multivibrator responsive to synchronization pulses generated photoelectrically by the presence of a film discontinuity, such as for example a sprocket hole, at a sensing station. The multivibrator has a free-running period just a few miliseconds longer than the film frame-to-frame interval so that the clutch will continue to be actuated at close to the film frame rate even if synchronization pulses are lost for a few frames. A short time delay is provided in the sprocket hole sensing circuit so that the leading edge of the sprocket hole, which might be damaged, is ignored and the triggering is accomplished by the trailing edge of the sprocket hole. When the clutch releases, the mirror is quickly returned to its starting point by a spring.

The invention, and its objects and advantages, will become more apparent in the detailed description of the preferred embodiment presented below in conjunction with the accompanying drawings.

BRIEF DESCRIPTION OF THE DRAWING

In the detailed description of the preferred embodiments of the invention presented below, reference is made to the accompanying drawing, in which:

FIG. 1 is a diagrammatic view in perspective of a portion of a motion picture projection apparatus according to a specific illustrative embodiment of the present invention;

FIG. 2 is an enlarged sectional view taken along line 2—2 of FIG. 1 showing the electromagnetic clutch mechanism and return spring;

FIG. 3 is an enlarged sectional view taken on line 3—3 of FIG. 1 showing particularly the spiral return spring for the mirror shaft.

DESCRIPTION OF THE PREFERRED EMBODIMENT

Figure 4:
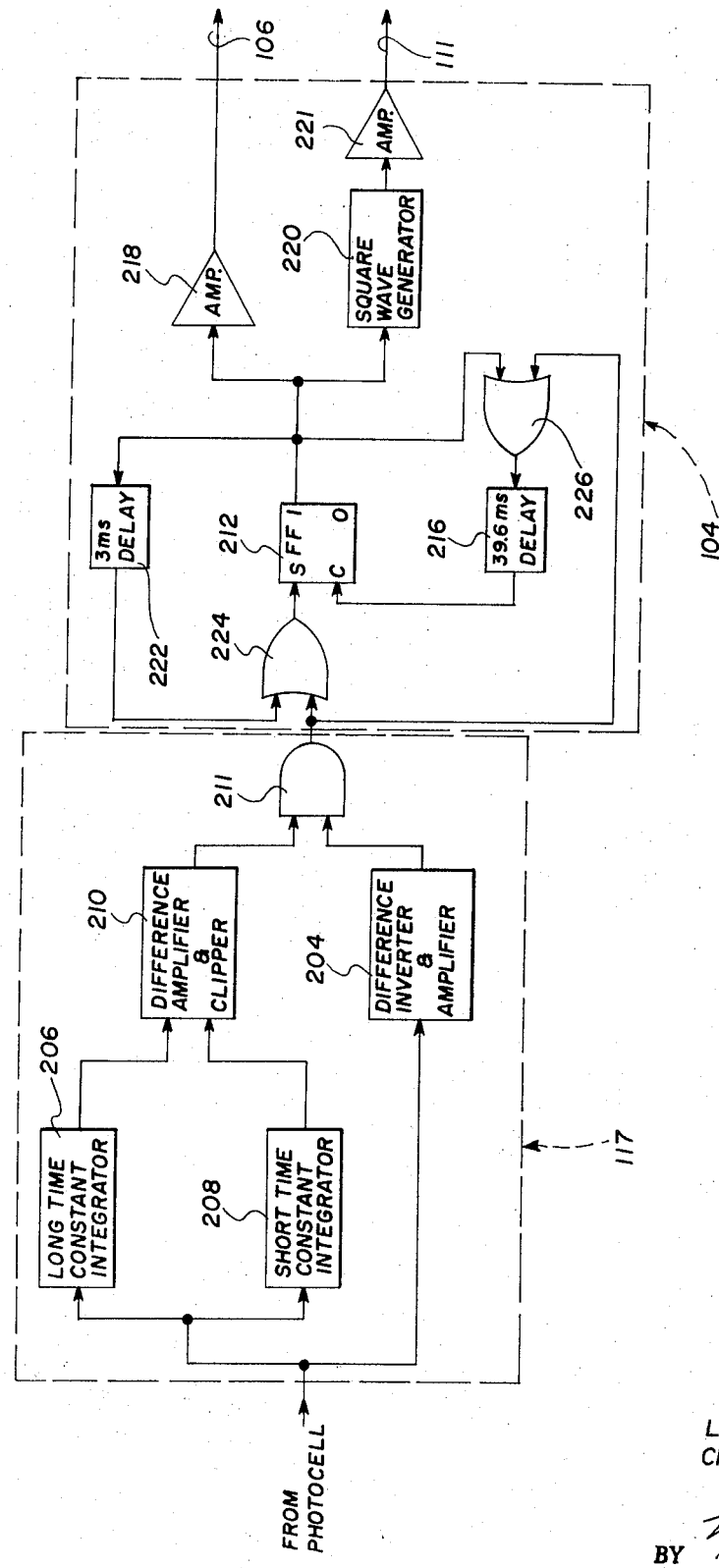
FIG. 4 is a schematic view of the perforation edge discriminator and miltivibrator circuits.

Because projectors are well known, the present description will be directed in particular to elements forming part of, or cooperating more directly with, apparatus in accordance with the present invention. It is to be understood that projector elements not specifically shown or described may take various forms well known to those skilled in the art.

Referring now to FIG. 1, there is shown a specific illustrative embodiment of the present invention wherein a perforated motion picture filmstrip 11 is advanced through a curved film gate 12 comprising an aperture plate 13 and a pressure pad 14. The film is driven by a capstan 15 and a pressure roller 16. Capstan 15 is powered by a motor 17 through a shaft 18 and suitable coupling means, not shown. Conventional filmstrip 11 has spaced picture frames or image areas 20 of usual arrangement and is provided with a series of sprocket hole perforations 22, one perforation per image area. Image areas 20 of film 11 are separated by frame lines 24. At the top of gate 12, an idler roller 26 serves to guide film 11 into the gate.

Curved aperture plate 13 defines an aperture 28 having a dimension in the direction of film travel approximately equal to two image areas of film. Pressure pad 14 has a similar aperture formed therein. Light from a suitable source, such as for example a lamp 30, passes through a condenser lens system 32 and an opening in a shutter 40 (when normally closed vanes 41 and 42 are open) to uniformly illuminate all of the film in aperture 28. Shutter 40 has been shown schematically. In practice, the shutter may take the form of a two-bladed rotary shutter operated by a two pole synchronous motor shown schematically as shutter operator 43. The projected light transmitted through the film is intercepted by a mirror 44 which is fixed to a rotatable shaft 45. The reflecting surface of mirror 44 passes through the mirror's pivot axis at the center of curvature of film gate 12. Light reflected by mirror 44 passes through an objective lens 47 and is reflected by a stationary mirror 48 towards a viewing screen 51. The nodal point of lens 47 lies on the pivotal axis of mirror 44.

Mirror 44 is driven by power means including a shaft 52 which is continuously rotated by film drive motor 17 through spiral gear assembly 53 connecting shafts 18 and 52. Shaft 52 is coupled to mirror 44 through a quick acting electromagnetic clutch 54, a shaft 57, a spring assembly 59, a shaft 61, suitable geared coupling elements inside a gear box 71 and the shaft 45.

As shown more clearly in FIG. 2, electromagnetic clutch 54 includes a driving element 72 fixed to shaft 52, and a driven element 73 fixed to shaft 57. Also fixed to shaft 52 is an armature 74, a set of electromagnetic windings 77 being positioned around armature 74 and enclosed by driving element 72. The assembly is closed by a face plate 78 formed of a material having a low magnetic permeability characteristic. A pair of commutator rings 81 and 82 are positioned around the outer circumference of driving element 72 to permit continuous outside circuit connection with electromagnetic windings 77 while element 72 is rotating. As shown, the commutator rings are of course suitably insulated from element 72.

Driven element 73 is non-rotatably coupled to shaft 57 by a tab 83 of rectangular cross-section positioned in a radial slot 84 provided in the end of the shaft. Because of this coupling, element 73 is permitted restricted axial movement along shaft 57 to engage element 78. This axial motion is opposed by the force of a coiled spring 87 which is positioned between an enlarged end portion of shaft 57 and a split face or closure plate 88 attached to element 73. As shown, a suitable recess 90 is provided in element 73 for accommodating the head portion of shaft 57 and coiled spring 87. If desired, the adjacent surfaces of plate 78 and element 73 may be provided with suitable high friction material.

Normally, that is when energizing current is not supplied to electromagnetic windings 77, the clutch is disengaged with elements 72 and 73 being separated as shown in FIG. 2 by spring 87. During such times, element 72 and other parts of the driving section of clutch 54 are rotated by motor 17, but element 73 and other parts of the driven portion of the clutch remain stationary. Mirror 44 is also stationary during these periods. When the electromagnetic winding is energized (by means explained hereinafter), a magnetic field is set to attract element 73, which thereupon moves axially against the force of coiled spring 87 until firm engagement of the adjacent surfaces of members 73 and 78 results. When this engagement is effected, element 73 and shaft 57 to which it is coupled by tab 83 are rotated by the driving portion of clutch 54. This rotation causes rotation of mirror 44 by means of the coupling of shafts 57 and 45 by the gear elements provided in box 71. Spiral gear assembly 53 and the gears in box 71 may be selected by one skilled in the art to rotate mirror 44 at an angular velocity which is one half the velocity of a point on film 11 passing through aperture 28, the direction of motion of the mirror and the film being the same. As such, the projected image of the point on screen 51 is stationary.

Referring to FIGS. 2 and 3, spring assembly 59 comprising a spiral spring 101 is positioned around shaft 57, one end of the spring being attached to the shaft and the other end being anchored to the inner wall of a casing 102 within which the spring is positioned. Casing 102 is anchored to a stationary member by suitable means, indicated at 103, so that, as shaft 57 is rotated upon the engagement of clutch 54, casing 102 remains stationary and spring 101 is wound tightly upon itself to store energy. When winding 77 is deenergized at the completion of a movement cycle of mirror 44 and clutch 54 disengages, shaft 57 is immediately rotated by spring 101 in a direction opposite to that of its first rotation, and mirror 44 is thereby returned to its rest or starting position for the next sweep cycle. During this return motion, vanes 41 and 42 of shutter 40 are closed to intercept the light beam before it reaches the film.

The current pulses for intermittent operation of clutch 54 are supplied by a free-running multivibrator 104 over an electrical lead 106. The circuit of multivibrator 104 will be described hereinafter with particular reference to FIG. 4. Similarly, pulses for activating shutter operator 43 are supplied by the multivibrator over a lead 111. The voltage supplied by multivibrator 104 to the clutch is essentially a square wave. The free-running time of multivibrator 104 is a few milliseconds longer than the film frame rate.

Multivibrator 104 may be actuated at a faster rate, one which is exactly synchronized with the film frame rate by sensing sprocket perforations 22 at the edge of the film, film frame lines 24 or any other repeated coding as discontinuity in the film. In the embodiment shown, the film perforations are detected at a monitoring station. A photoelectric cell 112 positioned at the monitoring station is adjusted to be activated when light from a lamp 113 passes through a sprocket perforation in film 11. If desired, the monitoring station may be located at any other suitable point along the film path, such as for example at a point above gate 12. Illumination for activating cell 112 may be derived from lamp 30 if desired.

A perforation edge discriminator or sensing circuit 117 is activated by current from photocell 112, and, in accordance with a novel feature of the present invention, the sensing circuit is given a delayed action characteristic. By virtue of this delayed action characteristic, sensing circuit 117 is responsive to the presence of the trailing edge of a perforation rather than to the leading edge. This novel arrangement results in much more accurate synchronization since it has been shown that damage to a sprocket perforation, if present, is most apt to be on the leading edge of the perforation rather than on the trailing edge. Obviously, more accurate synchronization results if the predominately undamaged portions of the perforations are utilized for the control. The circuit of the perforation edge discriminator will be described hereinafter with particular reference to FIG. 4.

Multivibrator 104 is activated by the periodic outputs from sensing circuit 117 to override the free-running time of the multivibrator and to control the duration of its ON and OFF periods. This properly synchronizes the output current pulses of multivibrator 104 to clutch 54 and shutter operator 43 with the movement of film 11. Since the free-running period of the multivibrator is only a few milliseconds longer than the film frame-to-frame interval, the multivibrator will continue to produce output pulses substantially in phase with the film movement even though no perforations are detected by photocell 113 for a few frames. Of course, during this period there might be some slight drift in the frame line due to the delayed energization pulses, but as soon as a perforation is detected, synchronization will be resumed and the frame line will move out of the picture area.

At the time a pulse is supplied over lines 106 and 107 to cause engagement of the clutch to start the motion cycle of mirror 44, a pulse applied over line 111 causes shutter operator 43 to open vanes 41 and 42 of shutter 40. When multivibrator 104 switches OFF and mirror 44, having completed its motion cycle, is returning to its starting point, shutter operator 43 closes shutter vanes 41 and 42 until the start of the next cycle.

By way of example, we have shown in FIG. 4 a schematic of circuit which may be used for perforation edge discriminator and amplifier 117 and free-running multivibrator and amplifier 104, each element being known per se. Referring to that figure, an electrical pulse, which will approximate a square wave, from photocell 112 provides the input to discriminator and amplifier 117. The pulse forms the input to a differentiator, inverter and amplifier shown as 204, the output of which is a strong positive pulse corresponding to the trailing edge of a film perforation and a weak positive pulse corresponding to the leading edge of a film perforation. The photocell pulse is integrated by a long time constant intergrator 206 (for example 200 milliseconds, or approximately five frames of film) which yields a nearly constant voltage proportional to the average density along the track of the perforations and by a short time constant integrator 208 (for example 5 milliseconds) which yields a voltage pulse the center of mass of which occurs slightly later than the time at which the center of the perforation passes the scanning point. At the difference amplifier and clipper 210, the long time constant integration is subtracted from the short time constant integration, and the difference is amplified and clipped to yield a gating pulse for AND gate 211 which will not pass any pulse created by the leading edge of the perforations but which will pass the pulses created by the trailing edge of the perforations.

The output of discriminator and amplifier 117 provides a "sync pulse" to multivibrator and amplifier 104 which includes a flip-flop 212 that can be set to the "one" condition by the received "sync pulse" and cleared to the "zero" condition by its own output 214. Assuming that the spacing of the film perforations and the speed of the film is such that the "sync pulses" are normally spaced 41.6 milliseconds apart, the clearing of flip-flop 212 by its own output is preferably delayed for 39.6 milliseconds by a delay circuit 216. The output of flip-flop 212 is amplified at 218 to engage clutch 54, thereby causing mirror 44 to track a frame of the film. The output of the flip-flop also triggers a square wave generator 220, the output of which is amplified at 221 to control the shutter as described hereinbefore.

In the event that a "sync pulse" is not delivered to flip-flop 212 (as would result for example from damaged film or a film splice), a feedback circuit including a three millisecond delay 222 triggered by the trailing edge of the output from flip-flop 212 has been provided to supply an auto-pulse substitute thru an OR gate 224 for the missing pulse needed to reset the flip-flop to the "one" condition. The auto-pulse occurs three milliseconds after the flip-flop has been cleared or 1 millisecond later than the expected pulse from the film. Repeated auto cycle will result in a slight drift out of frame of the picture. If desired, the delay can be reduced down to two milliseconds to reduce the rate of drift. In order to provide for start-up and for resynchronization in the event synchronization is lost due to the absence of perforations, incorrect splicing or other causes, delay 216 will be reset by the "sync pulse" to zero through an OR gate 226 if a "sync pulse" occurs during the mirror scan portion of the clutch voltage. This reset will result in a scan cycle which is too long, but which will terminate at the correct time for the next cycle to be in synchronization.

Since the rate at which a point on the film passes through the film gate is independent of film shrinkage, it will be obvious that in the use of the novel arrangement described, the mirror rate is also independent of film shrinkage. The novel arrangement contemplated by our invention provides efficient means for synchronizing all of the elements of the projection apparatus. The mirror operation is perfectly timed with the shutter operation since both are controlled by a common means, that is the multivibrator. Actuation of the multivibrator is timed to film movement since it is responsive to the presence of a film discontinuity at a monitoring station, and mirror movement is perfectly matched to film movement since there is provided a direct mechanical connection between the film drive and the mirror. The spiral spring associated with the driven elements of the clutch provides simple and effective means for quickly returning the mirror to its rest or starting position at the completion of each motion cycle.

The invention has been described in detail with particular reference to a preferred embodiment thereof, but it will be understood that variations and modifications can be effected within the spirit and scope of the invention.

We claim:

1. In a motion picture projection apparatus having a housing, means on said housing for receiving an elongated film-strip having aligned image areas and spaced discontinuities of fixed spacial relationship relative to the image areas, means on said housing for defining a path for a received filmstrip, a film gate along said path, an aperture defined by said film gate, a film discontinuity monitoring station along said path having means for detecting the presence of a film discontinuity at said monitoring station, drive means for continuously advancing a received filmstrip along said path past said aperture and said monitoring station, and a light source mounted on said housing to illuminate said aperture for projecting images from the image areas of the filmstrip advanced past said aperture; the improvement comprising:

a mirror for receiving and reflecting the projected images, said mirror being mounted on said housing for rotation between a first position and a second position about an axis normal to the direction of film movement through said gate;

means actuatable for interconnecting said mirror and said drive means to move said mirror from said first position to said second position at an angular velocity which is a function of the film speed past said aperture to maintain said reflected image stationary;

means for returning said mirror from said second position to said first position; and means for actuating said interconnecting means in response to the detection of the presence of a film discontinuity at said monitoring station.

2. The improvement as defined in claim 1 wherein said interconnecting means comprises:

a normally disengaged clutch; and
means for engaging said clutch in response to said actuating means.

3. The improvement as defined in claim 1 wherein:

said interconnecting means comprises a normally disengaged electromagnetic clutch; and
said actuating means comprises means for electrically engaging said clutch.

4. The improvement as defined in claim 3 wherein:

said detecting means comprises a photoelectric pickup for producing an electrical pulse in response to the presence of a discontinuity at said monitoring station; and
said means for engaging said clutch comprises an electrical circuit responsive to said electrical pulse for applying an electrical signal to said clutch to engage said clutch.

5. The improvement as defined in claim 1 wherein:

said detecting means comprises a photoelectric pickup for producing an electrical pulse in response to the presence of a discontinuity at said monitoring station;
said actuating means comprises (1) an electrical circuit responsive to said electrical pulse for generating a "sync pulse", and (2) a multivibrator responsive to said "sync pulse" for producing an electrical signal; and
said interconnecting means comprises a normally disengaged electromagnetic clutch engageable in response to and for the duration of said electrical signal.

6. The improvement as defined in claim 5 wherein said detecting means includes means responsive to the trailing edge of a film sprocket perforation for producing said electrical pulse.

7. The improvement as defined in claim 5 wherein said multivibrator is free-running with a period slightly longer than the expected period of discontinuity detections, whereby said clutch will be engaged once per period of the free-running multivibrator if said electrical pulses are not produced by said photoelectric pickup.

* * * * *